(12) United States Patent
Shi et al.

(10) Patent No.: US 11,086,510 B2
(45) Date of Patent: Aug. 10, 2021

(54) SPLIT SCREEN CONTROL METHOD BASED ON SCREEN-OFF GESTURES, AND STORAGE MEDIUM AND MOBILE TERMINAL THEREOF

(71) Applicant: GUANGDONG OPPO MOBILE TELECOMMUNICATIONS CORP., LTD., Guangdong (CN)

(72) Inventors: Rendong Shi, Guangdong (CN); Mingqiang Guo, Guangdong (CN); Qiang Zhang, Guangdong (CN); Tong Han, Guangdong (CN); Hao Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 30 days.

(21) Appl. No.: 16/045,840

(22) Filed: Jul. 26, 2018

(65) Prior Publication Data
US 2019/0034073 A1    Jan. 31, 2019

(30) Foreign Application Priority Data
Jul. 28, 2017 (CN) .......................... 201710632259.1

(51) Int. Cl.
*G06F 9/4401* (2018.01)
*H04M 1/67* (2006.01)
(Continued)

(52) U.S. Cl.
CPC ........ *G06F 3/04883* (2013.01); *G06F 1/3231* (2013.01); *G06F 1/3265* (2013.01);
(Continued)

(58) Field of Classification Search
CPC .... G06F 1/3231; G06F 1/3287; G06F 9/4418; G06F 21/32; G06F 3/04886;
(Continued)

(56) References Cited

U.S. PATENT DOCUMENTS

| | | | |
|---|---|---|---|
| 2010/0081475 A1* | 4/2010 | Chiang | G06F 3/0483 455/564 |
| 2011/0107272 A1* | 5/2011 | Aguilar | G06F 3/04815 715/853 |

(Continued)

FOREIGN PATENT DOCUMENTS

| CN | 104346100 A | 2/2015 |
|---|---|---|
| CN | 104834437 A | 8/2015 |

(Continued)

OTHER PUBLICATIONS

International Search Report in international application No. PCT/CN2018/097435, dated Oct. 18, 2018.

(Continued)

*Primary Examiner* — Henry Orr
(74) *Attorney, Agent, or Firm* — Ladas & Parry LLP

(57) ABSTRACT

A control method based on screen-off gestures, storage medium and a mobile terminal thereof are disclosed. A first screen-off gesture can be acquired when a display screen is in a screen-off state, and a corresponding first target application can be determined according to the first screen-off gesture. When it is detected that a split-screen event is triggered, a second screen-off gesture can be acquired, and a corresponding second target application can be determined according to the second screen-off gesture. The display screen can be waked up, and the first target application and the second target application can be opened in a split-screen mode.

16 Claims, 12 Drawing Sheets

(51) Int. Cl.
*G06F 3/0488* (2013.01)
*G06F 21/36* (2013.01)
*G06F 3/0481* (2013.01)
*G06F 1/3234* (2019.01)
*H04M 1/72403* (2021.01)
*G06F 1/3231* (2019.01)
*G06F 1/3287* (2019.01)
*G06F 21/32* (2013.01)

(52) U.S. Cl.
CPC .......... *G06F 1/3287* (2013.01); *G06F 3/0481* (2013.01); *G06F 3/04886* (2013.01); *G06F 9/4418* (2013.01); *G06F 21/32* (2013.01); *G06F 21/36* (2013.01); *H04M 1/72403* (2021.01); *G06F 2203/04803* (2013.01); *H04M 1/67* (2013.01); *H04M 2250/22* (2013.01)

(58) Field of Classification Search
CPC ...... G06F 1/3265; G06F 3/0481; G06F 21/36; G06F 2203/04803; G06F 3/04883; H04M 1/67; H04M 1/72522; H04M 2250/22
USPC .......................................................... 715/792
See application file for complete search history.

(56) References Cited

U.S. PATENT DOCUMENTS

| | | | | |
|---|---|---|---|---|
| 2012/0176322 A1* | 7/2012 | Karmi | ................. | G06F 3/04883 345/173 |
| 2012/0297400 A1* | 11/2012 | Hill | ....................... | G06F 16/748 719/318 |
| 2013/0080940 A1* | 3/2013 | Reeves | ................. | G06F 1/1616 715/761 |
| 2013/0222321 A1* | 8/2013 | Buening | ................. | G06F 3/041 345/173 |
| 2013/0263042 A1* | 10/2013 | Buening | ............... | G06F 3/0488 715/783 |
| 2013/0305184 A1* | 11/2013 | Kim | ...................... | G06F 3/0482 715/781 |
| 2013/0326395 A1* | 12/2013 | Oh | .......................... | G06F 3/041 715/781 |
| 2014/0058679 A1* | 2/2014 | Varoglu | ............. | H04M 1/72569 702/19 |
| 2014/0344765 A1* | 11/2014 | Hicks | .................. | G06F 3/04883 715/863 |
| 2014/0351748 A1* | 11/2014 | Xia | ....................... | G06F 3/0481 715/798 |
| 2015/0172238 A1* | 6/2015 | Ahmed | .................... | H04L 51/08 709/217 |
| 2015/0264169 A1* | 9/2015 | Yim | .................. | H04M 1/72563 455/411 |
| 2016/0196419 A1* | 7/2016 | Kuscher | ............ | H04M 1/72577 715/741 |
| 2017/0068416 A1* | 3/2017 | Li | ........................ | G06F 3/04812 |
| 2017/0102758 A1 | 4/2017 | Siaw et al. | | |

FOREIGN PATENT DOCUMENTS

| | | |
|---|---|---|
| CN | 104915133 A | 9/2015 |
| CN | 104915169 A | 9/2015 |
| CN | 106168870 A | 11/2016 |
| CN | 106445093 A | 2/2017 |
| CN | 106569717 A | 4/2017 |
| CN | 106775362 A | 5/2017 |
| CN | 107483721 A | 12/2017 |
| EP | 2919108 A1 | 9/2015 |
| EP | 3435217 A1 | 1/2019 |

OTHER PUBLICATIONS

Written Opinion of the International Search Authority in international application No. PCT/CN2018/097435, dated Oct. 18, 2018.
CN104346100 A _ English Abstract.
CN104915169 A _ English Abstract.
Supplementary European Search Report in European application No. 18186093.3, dated Jan. 4, 2019.
Office Action of the Indian application No. 201814028379, dated Nov. 19, 2020.

* cited by examiner

SPLIT SCREEN CONTROL METHOD BASED ON SCREEN-OFF GESTURES, AND STORAGE MEDIUM AND MOBILE TERMINAL THEREOF

CROSS REFERENCE TO RELATED APPLICATIONS

This application claims the priority benefit of Chinese Patent Application No. 201710632259.1, titled "CONTROL METHOD BASED ON SCREEN-OFF GESTURES, APPARATUS, STORAGE MEDIUM AND MOBILE TERMINAL THEREOF" and filed on Jul. 28, 2017, the contents of which are incorporated by reference herein their entirety for all purposes.

TECHNICAL FIELD

Embodiments of the present disclosure relate to the field of touch technologies, and in particular, to a control method based on screen-off gestures, and a storage medium and mobile terminal thereof.

BACKGROUND TECHNOLOGY

At present, incorporation the display screen has become the standard configuration of the mobile terminal, and the size of the display screen is becoming larger and larger as one of the most power-consuming devices in the mobile terminal. Therefore, when the user temporarily does not use the mobile terminal, the display screen needs to be turned off into a sleep mode.

When the user wants to restore the use of the mobile terminal, the screen needs to be waked up. A common wake-up method is pressing a physical key such as a power button or pressing a fingerprint sensor, etc. Frequent pressing of the above components may affect the life span, so now many mobile terminals support the wake-up mode of screen-off gestures.

The screen-off gesture generally refers to the gesture action that the mobile terminal detects on the touch screen when the display screen is in a screen-off state. The appearance of the screen-off gesture enriches the wake-up modes of the mobile terminal. However, the control solution based on the screen-off gesture is limited to waking up the mobile terminal or opening the corresponding application program, and still needs further optimization.

DETAILED DESCRIPTION

Figure 1:
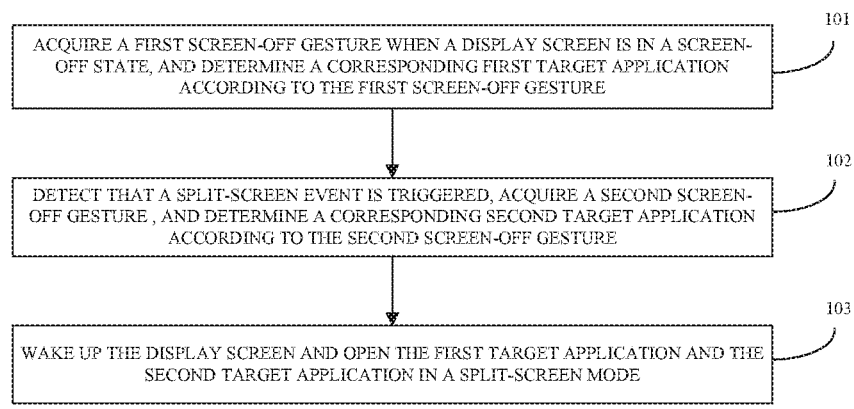
FIG. 1 is a schematic flowchart of a control method based on screen-off gestures provided by an embodiment of the present disclosure.

The present disclosure will be further described in detail below with reference to the accompanying drawings and embodiments. It can be understood that the specific embodiments described herein are only used to explain the present disclosure and not to limit the present disclosure. It should also be noted that for ease of description, only some but not all of the structures related to the present disclosure are shown in the drawings.

Before discussing the exemplary embodiments in more detail, it should be mentioned that some exemplary embodiments are described as a process or method depicted as a flow diagram. Although a flow diagram describes the steps as a sequential process, many of the steps may be performed in parallel, concurrently or simultaneously. In addition, the order of the steps can be rearranged. The process may be terminated when its operation is completed, but it may also have additional steps not included in the drawings. The processing may correspond to methods, functions, procedures, subroutines, subprograms or the like.

FIG. 1 is a schematic flow chart of a control method based on screen-off gestures provided by an embodiment of the present disclosure. The method may be executed by a control device based on screen-off gestures, wherein the device may be implemented by software and/or hardware, and may generally be integrated in a mobile terminal.

The method can include actions in blocks illustrated in FIG. 1. The method can begin at block 101. At block 101, a first screen-off gesture is acquired when the display screen is in a screen-off state, and a corresponding first target application is determined according to the first screen-off gesture.

Exemplarily, the mobile terminal in the embodiment of the present disclosure may include a mobile device provided with a touch display screen such as a mobile phone, a tablet computer, and a media player. As a display device of a mobile terminal, the touch display screen is generally integrated with a touch panel, a display panel, and a cover glass cover, and has a touch and display function. In order to facilitate the description of a specific scene, the touch display screen is abbreviated as a touch screen or a display screen.

Exemplarily, when the user does not need to use the mobile terminal, the display screen of the mobile terminal is usually turned off, such as by pressing the power key. In addition, when the user places aside the mobile terminal in a light screen state without performing any operation, the display screen will automatically be turned off after a period of time. In addition to the above two cases, there may be other situations in which the display screen needs to be turned off. After the display screen is turned off, the mobile terminal will be in a screen-off (screen off) state. At this time, the system of the mobile terminal is generally in a sleep state.

Exemplarily, this may also be optimized to acquire a first screen-off gesture when a screen-off gesture event is detected in a screen-off state of the display screen. The screen-off gesture event may be an event representing a screen-off gesture input that is pre-negotiated by a driver layer and an application layer. The advantage of such setting is that it can avoid the mobile terminal from being in a gesture receiving state under a screen-off state and save power consumption. In at least one alternative embodiment, detection of the screen-off gesture event may include detecting that a first preset area of the display screen is touched, and may further include detecting a proximity event of the proximity sensor, and the like, which is not limited in the embodiment of the present disclosure. The first preset area is a partial area of the display screen, for example, a rectangular area located at the upper left corner of the display screen. The rectangular area can be set smaller, and the length and width thereof can be a first preset ratio of the length of the display screen respectively. The second preset ratio of the display screen width, for example, the length is $\frac{1}{10}$ of the display screen length, and the width is $\frac{1}{10}$ of the display screen width.

Figure 2:
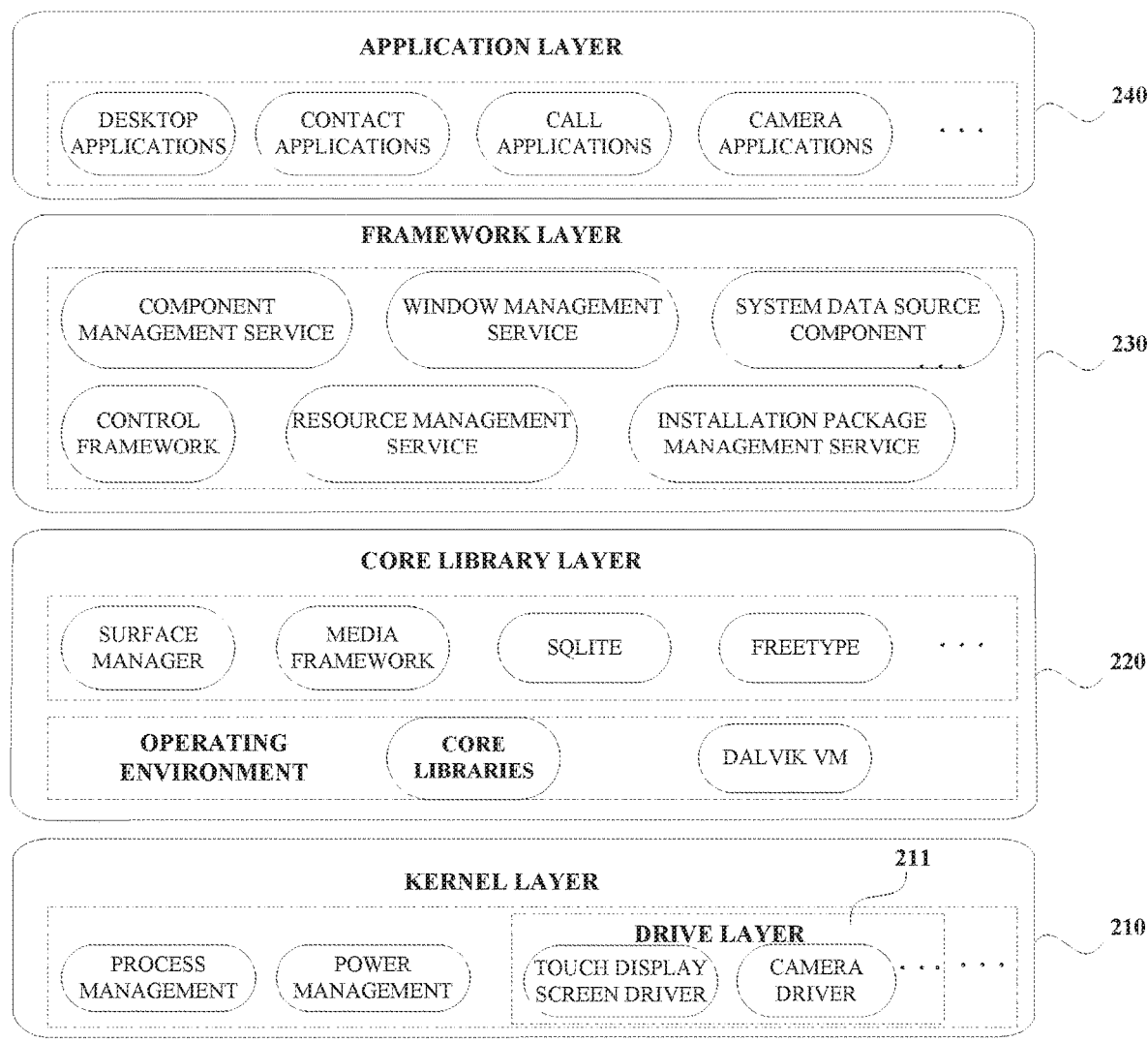
FIG. 2 is a schematic diagram of an Android system framework provided by an embodiment of the present disclosure.

In the embodiments of the present disclosure, the screen-off gesture may be a touch gesture on a display screen in a screen-off state after the screen-off gesture function is enabled. FIG. 2 is a schematic diagram of an Android system framework according to an embodiment of the present disclosure. Taking the mobile terminal with an Android operating system as shown in FIG. 2 as an example, the implementation process of the screen-off gesture function according to the embodiments of the present disclosure is illustrated. As shown in FIG. 2, the Android system framework includes, from bottom to top, a kernel layer 210, a core library layer 220, a framework layer 230, and an application layer 240. The kernel layer 210 provides core system services including security, memory management, process management, network protocol stacks, and hardware drivers or the like. The hardware driver in the kernel layer 210 is recorded as a driver layer 211, and the drive layer 211 includes a touch display screen driver, a camera driver, etc. The core library layer 220 includes Android Runtime and Libraries. Android Runtime provides most of the features available in the Java programming language core library, including Core Libraries and Dalvik VMs. Each Android application is an instance of a Dalvik virtual machine running in its own process. The library is provided for various components of the Android system, including the following functions: Media Framework, Surface Manager, SQLite (Relational Database Engine), and FreeType (Bitmap and Vector Font Rendering), and the various functions are exposed to developers through the framework layer 230 of the Android system. The framework layer 230 provides a series of libraries required for the development of Android applications, allowing the developers to perform rapid application development, to facilitate the reuse of components, and also to achieve individualized extensions through inheritance. The services it provides include component management services, window management services, system data source components, control frameworks, resource management services, and installation package management services etc. The application layer 240 includes various types of applications that directly interact with the user, or service programs written in the Java language and run in the background, which includes desktop applications, contact applications, call applications, camera applications, picture viewers, games, maps, web browsers, and other applications developed by the developers.

Figure 3:
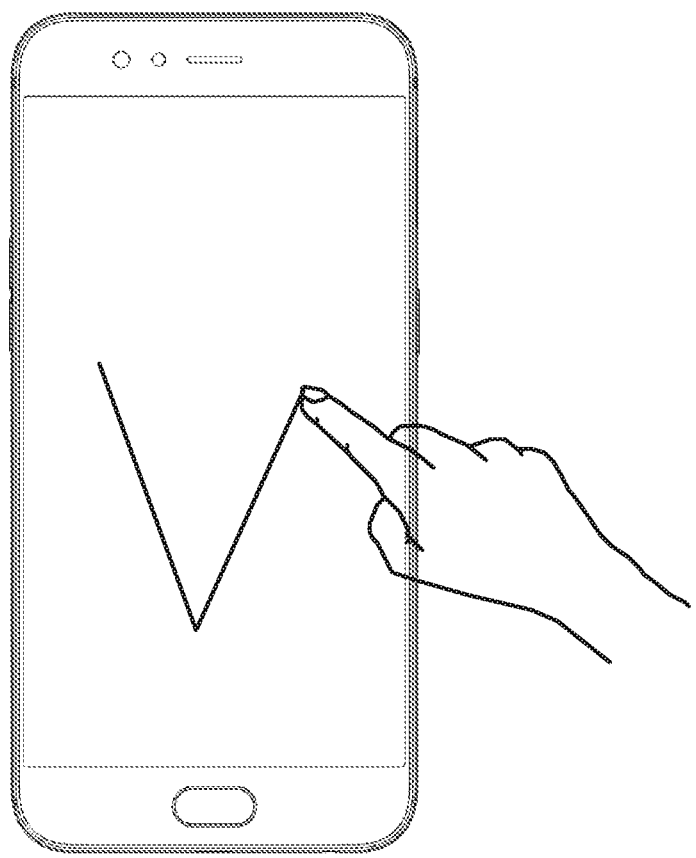
FIG. 3 is a schematic diagram of a screen-off gesture input according to an embodiment of the present disclosure.

Exemplarily, after the screen-off gesture function is enabled, a wake-up signal is generated by the touch chip when a screen-off gesture is detected, and the wake-up signal is sent to the kernel layer. The kernel layer is triggered by the wake-up signal to perform a system wake-up operation. After the system is waked up, the kernel layer calls the drive layer interrupt function to execute the operation of reading the gesture data in the touch chip, and the gesture data that has been read is stored in a preset node of the drive layer. The set node may be a file node. For example, it can be a virtual file node under the proc-D directory. After the data reading is completed, the drive layer determines the validity of the gesture data. There are many ways to determine the validity, which are not specifically limited in this embodiment. For example, the drive layer determines the gesture type according to the coordinate information contained in the gesture data, and the determined gesture type is stored as a gesture data in the preset node. If the gesture type is not a predetermined screen-off gesture, it is determined that the gesture data is invalid. For another example, the drive layer counts the amount of the gesture data, and it is determined that whether the amount satisfies a requirement for drawing a predetermined screen-off gesture, and if not, it is determined that the gesture data is invalid. When the data is valid, the drive layer reports a screen-off event. The screen-off gesture events are transmitted to the framework layer through the core library layer, and are distributed through the framework layer to reach to the application layer. When the application layer has acquired the screen-off gesture event, the gesture data is read by a preset node of the drive layer. After the preparation of the gesture data is completed, a screen-off gesture trajectory is calculated according to the coordinate information contained in the gesture data, and the screen-off gesture trajectory is drawn on the touch display screen for display. Then, the application layer opens an application corresponding to the gesture type based on the gesture type in the read gesture data. The gesture type may be a gesture for implementing a certain function preset in the terminal, and may also be a user-defined gesture. Different gesture types correspond to different applications that are to be opened. For example, the gesture type may be an O, which represents opening the camera. For another example, the gesture type may be a V, which represents opening a flashlight etc. FIG. 3 is a schematic diagram of a screen-off gesture input according to an embodiment of the present disclosure. As illustrated in FIG. 3, a screen-off gesture of the V type has been input on the screen by the user.

Exemplarily, the corresponding relationship between different types of screen-off gestures and application programs may be set in advance. As described above, the gesture type O corresponds to a camera application, the gesture type V corresponds to a flashlight application, and the like. In at least one alternative embodiment, a motion trajectory of the received first screen-off gesture is acquired, a type of the first screen-off gesture is identified according to the motion trajectory, and a corresponding first target application is determined according to the type of the first screen-off gesture. The first target application and the second target application in the following steps are applications that need to be opened in the split-screen mode after the display screen is waked up.

At block 102, the method proceeds to detecting that a split-screen event is triggered, acquiring a second screen-off gesture, and determine a corresponding second target application according to the second screen-off gesture.

With the rapid development of mobile terminal technology, the configuration of mobile terminal is getting higher and higher, and more and more applications can be loaded. The users usually want to run multiple applications at the same time. The early mobile terminals only support displaying one application at the same time. When one application runs in the foreground, other applications have to run in the background. When the user wants to use the application B different from the currently displayed application A, the application A needs to be switched to the background, and the application B can then be switched to the foreground. The operation is cumbersome, and the display contents in the application A and the application B cannot be compared at the same time. With the development of mobile terminal display screen technology, the screen size is getting larger and larger, which provides a good foundation for solving the above problems. In this regard, the split-screen solution of the mobile terminal has emerged as the times require. Currently, the split-screen solution is generally performed in the display interface of the mobile terminal, and more often on the desktop. After the split-screen function is enabled, the split-screen mode is entered, and the applications to be in split-screen operation are selected by selecting the menu. After the selection is completed, the display interface of the mobile terminal is divided into a plurality of areas generally two, two upper and lower areas, or two left and right areas, etc.), and different areas display interfaces of different applications respectively, such as displaying the interfaces of application A and B respectively in the left half and the right half of the screen. In this way, the effect of simultaneously running multiple applications in the foreground is achieved.

Exemplarily, the user can enable the function of triggering the split-screen event on the screen-off in the mobile terminal according to his or her requirements. In the screen-off mode, the mobile terminal will detect the split-screen event at an appropriate time. Detecting that the split-screen event is triggered may include detecting that a second preset area of the display screen is touched, detecting a proximity event of the proximity sensor, detecting that a preset key (such as a volume adjustment key, etc.) is pressed, and detecting that a split-screen gesture is received, and the like, which is not limited in the embodiments of the present disclosure. The second preset area may be the same as or different from the first preset area. In at least one alternative embodiment, after the first screen-off gesture is acquired, if a second screen-off gesture is received within the set duration, it is detected that the split-screen event is triggered, and the second screen-off gesture is acquired. In other words, when the user continuously inputs two screen-off gestures within a certain period of time, it is considered that the split-screen event is triggered. The previous screen-off gesture is recorded as the first screen-off gesture, and the subsequent screen-off gesture is recorded as the second screen-off gesture.

In addition, the above-mentioned split-screen gesture can also be considered as a screen-off gesture, which does not correspond to an application, but corresponds to an instruction that triggers a split-screen event. In at least one alternative embodiment, different split-screen gestures may also correspond to different types of split-screen modes. Exemplarily, when the screen split gesture divides the screen into a plurality of areas, each area represents a split-screen area where an application interface is displayed. For example, taking the vertical placement of the mobile terminal as an example, when the split-screen gesture moves in a straight line in the width direction of the terminal, it represents a split-screen mode of the top and bottom structure. When the split-screen gesture moves in a straight line in the length direction of the terminal, it represents a split-screen mode of the left and right structure. When the split-screen gesture is a cross, it represents a split-screen mode in which the screen is divided into four rectangular areas.

In at least one alternative embodiment, the second screen-off gesture may be one or more than one. When the second screen-off gestures are multiple, the user may continuously input a plurality of second screen-off gestures at certain time intervals.

Exemplarily, determining a corresponding second target application according to the second screen-off gesture is similar to the previous process of determining the corresponding second target application according to the first blank screen gesture, and details are not described herein again.

It should be noted that, whether the split-screen event is triggered can also be detected during the process of determining the corresponding first target application according to the first screen-off gesture. That is, before the first target application is successfully identified due to a complicated first screen gesture or other factors, the split-screen event can also be detected. In addition, the receiving or acquiring process of the second screen-off gesture and the determining process of the first target application may also be performed in parallel, and the two do not conflict.

The method includes, at block 103, waking up the display screen and opening the first target application and the second target application in a split-screen mode. In the embodiment of the present disclosure, the split-screen mode may be a split-screen mode set in advance; it may also be determined dynamically according to the type of the split-screen event that is triggered, such as the split-screen modes of the top and bottom structure and the left and right structure as described above.

After the display is waked up, the interface of the display screen is divided according to the split-screen mode, and the application interfaces of the first and the second target applications are respectively displayed in different split-screen areas.

In at least one alternative embodiment, in the embodiment of the present disclosure, after the corresponding target applications is determined according to the screen-off gesture, opening of the target application may be prepared in advance, such as creating a target application process, etc., which is favorable for quick opening of the corresponding target application after wakeup of the display screen.

In the control method based on the screen-off gesture provided by the embodiment of the present disclosure, when the display screen is in a screen-off state, the first screen-off gesture is acquired and the corresponding first target application is determined. After detecting that the split-screen event is triggered, a second screen-off gesture is acquired, and a corresponding second target application is determined. The display screen is waked up and the first target application and the second target application are opened in a split-screen mode. By the above technical solution, it is possible to determine an application program requiring a split-screen operation according to a screen-off gesture in a screen-off state of the mobile terminal, and the split-screen operation efficiency can be improved.

In an embodiment, after the first screen-off gesture is acquired, a certain time may be set for detecting the split-screen event so as to achieve a reasonable timing for detecting the split-screen event. Specifically, detecting that the split-screen event is triggered and acquiring the second screen-off gesture includes: detecting whether the split-screen event is triggered within the first preset duration; if it is detected that the split-screen event is triggered, the second screen-off gesture is acquired. The first preset duration may be set by default in the system, or may be set by the user according to personal needs. The embodiment of the present disclosure does not limit the specific values thereof, and may be, for example, 2 seconds, or may be other values.

In an embodiment, after detecting whether the split-screen event is triggered within the first preset duration, the method further includes: if it is not detected that the split-screen event is triggered, wake up the display screen and open the first target application in a full-screen mode. Exemplarily, if the user does not trigger the split-screen event after exceeding the first preset duration, it indicates that the user does not need to enter the split-screen mode, and the first target application may be opened in the full-screen mode to meet the user's use requirement.

In an embodiment, after detecting that the split-screen event is triggered, a certain time may also be set for detecting the second screen-off gesture, so as to achieve a reasonable timing for detecting the second screen-off gesture. Specifically, detecting that the split-screen event is triggered, and acquiring the second screen-off gesture includes: detecting that the split-screen event is triggered, and detecting whether a second screen-off gesture is received within the second preset duration. If it is received, acquire the second screen-off gesture. The second preset duration may be set by the system by default, or may be set by the user according to personal needs. The embodiment of the present disclosure does not limit the specific value thereof, and may be, for example, 2 seconds, or other values.

In an embodiment, after detecting whether the second screen-off gesture is received within the second preset duration, the method further includes: if it is not received, waking up the display screen and opening the first target application in a full-screen mode. Alternatively, waking up the display screen and opening the first target application and the desktop in a split-screen mode; or, waking up the display screen and opening the first target application and the split-screen application selection interface in a split-screen mode. The above optimization provides the user with the opportunity to abandon entering the split-screen mode or abandon determining other split-screen applications other than the first target application in the screen-off mode. For example, the user triggers the split-screen event and does not want to enter the split-screen mode, and the user may choose to pause the input of the second screen-off gesture. After the second preset duration, the mobile terminal may wake the display screen and open the first target application in the full-screen mode. For another example, the user triggers the split-screen event and forgets the screen-off gesture corresponding to the split-screen application other than the first target application that need to operate in the split-screen, the user may also choose to pause the input of the second screen-off gesture. After a second preset duration, the mobile terminal can wake up the display screen and open the first target application and the desktop or the split-screen application selection interface in split-screen mode, and the user can select other applications that need to operate in the split-screen in the desktop or the split-screen application selection interface.

In an embodiment, the input position of the screen-off gesture can be associated to the area to display the corresponding application, so as to meet the user's operation requirements. Specifically, waking up the display screen and opening the first target application and the second target application in a split-screen mode include: acquiring a first input position information of the first screen-off gesture and a second input position information of the second screen-off gesture; waking up the display screen, and opening the first target application and the second target application in a split-screen mode according to the first input position information and the second input position information. The display area of the first target application corresponds to the first input position information, and the display area of the second target application corresponds to the second input position information. Exemplarily, the first input position information may specifically be input range information corresponding to the first screen-off gesture, the display area of the first target application in the split-screen mode is determined according to the input range information, and the second input position information is the same. In addition, when the split-screen gesture divides the screen into a plurality of split-screen areas, the first input position information may also include a split-screen area where the first screen-off gesture is located.

Currently, when a user uses an ordinary smart terminal, if an application has been opened, the user cannot open the application again. That is, only one account of the application can be logged in. For many users, multiple accounts are set for the same application due to various needs in work and life. Such users have strong needs to log in to multiple accounts at the same time on the same smart terminal. In order to satisfy the user's need to log in to multiple accounts of the same application at the same time, a multi-application solution has emerged. In this solution, the same application includes a main application and at least one clone application. The main application and each clone application can log in to their respective accounts to meet the needs of the user for multiple account login. The embodiment of the present disclosure can also be applied to a scenario in which the application is multi-open. Exemplarily, in an embodiment, when the first target application and the second target application are the same target application, it is determined that the target application is a multi-open application: the first target application is the main application, and the second target application is a clone application. Correspondingly, waking up the display screen and opening the first target application and the second target application in the split-screen mode includes: waking up the display screen and opening the main application and the clone application of the target application in the split-screen mode. The advantage of such a setting is that the split-screen solution in the screen-off in the embodiment of the present disclosure can be combined with the multi-open application. The main application and the clone application that need to operate in the split-screen can be determined according to the screen-off gesture in the screen-off state of the mobile terminal, which can improve the opening efficiency of multi-open applications in the split-screen mode.

In an embodiment, after the display is waked up, the mobile terminal may be in a locked state. When the unlocking information is received and the unlocking information is verified to pass, the first target application and the second target application are opened in the split-screen mode.

Exemplarily, the unlocking information may be character password information, graphic password information, or the like, or may be biometrics such as fingerprint information, which may be used to unlock the mobile terminal to obtain the use permission of the mobile terminal. The advantage of this setting is that the process of unlocking the mobile terminal and the screen splitting solution under the screen-off state are reasonably combined to ensure the privacy and safety of the user and quickly open the split-screen application. In addition, the unlocking information may also be received during or after receiving or acquiring the first screen-off gesture. At this time, the unlocking information may be biometrics such as fingerprint information, and then the unlocking information is verified. If the verification succeeds, the following process is continued. If the verification fails, the following process may be stopped, such as stopping receiving the screen-off gesture; that is, stopping the detection of the screen-off gesture. The advantage of this setting is that when the verification of the unlocking information fails, it indicates that the current user does not have the authority to use the mobile terminal. By stopping the subsequent process, the effect of saving power can be achieved.

Figure 4:
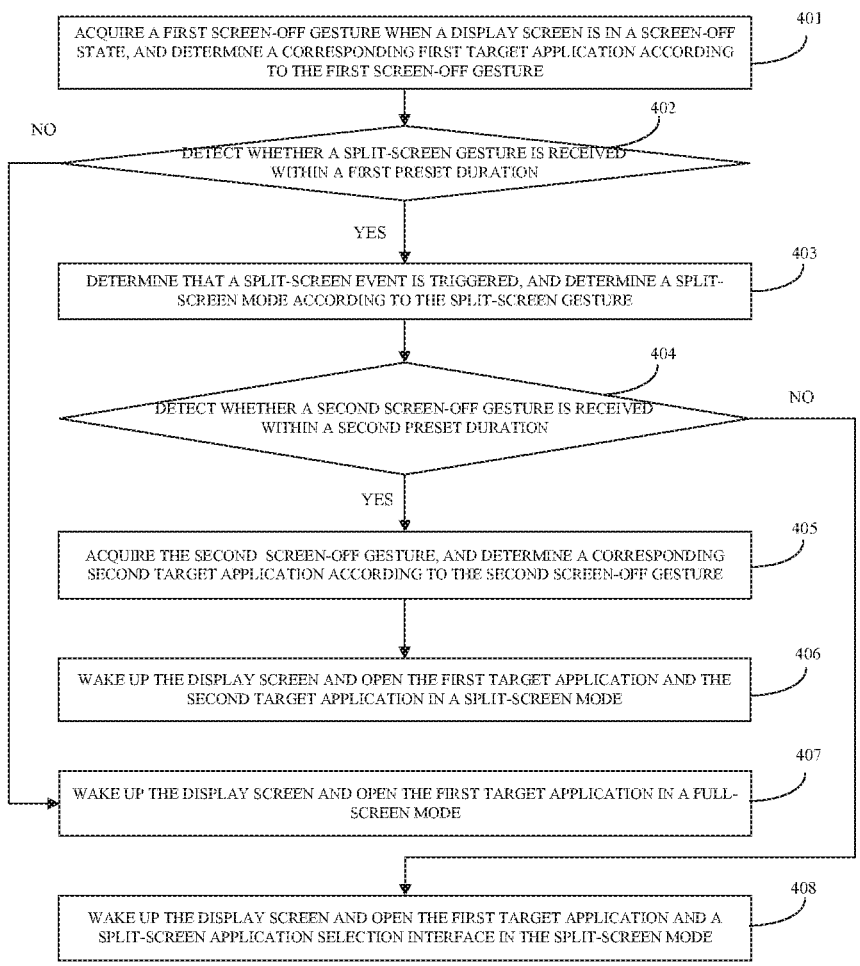
FIG. 4 is a schematic flowchart of another control method based on screen-off gestures provided by an embodiment of the present disclosure.

FIG. 4 is a schematic flowchart of another control method based on screen-off gestures provided by an embodiment of the present disclosure.

At block 401, the method proceeds to acquiring a first screen-off gesture when a display screen is in a screen-off state, and determining a corresponding first target application according to the first screen-off gesture.

Figure 5:
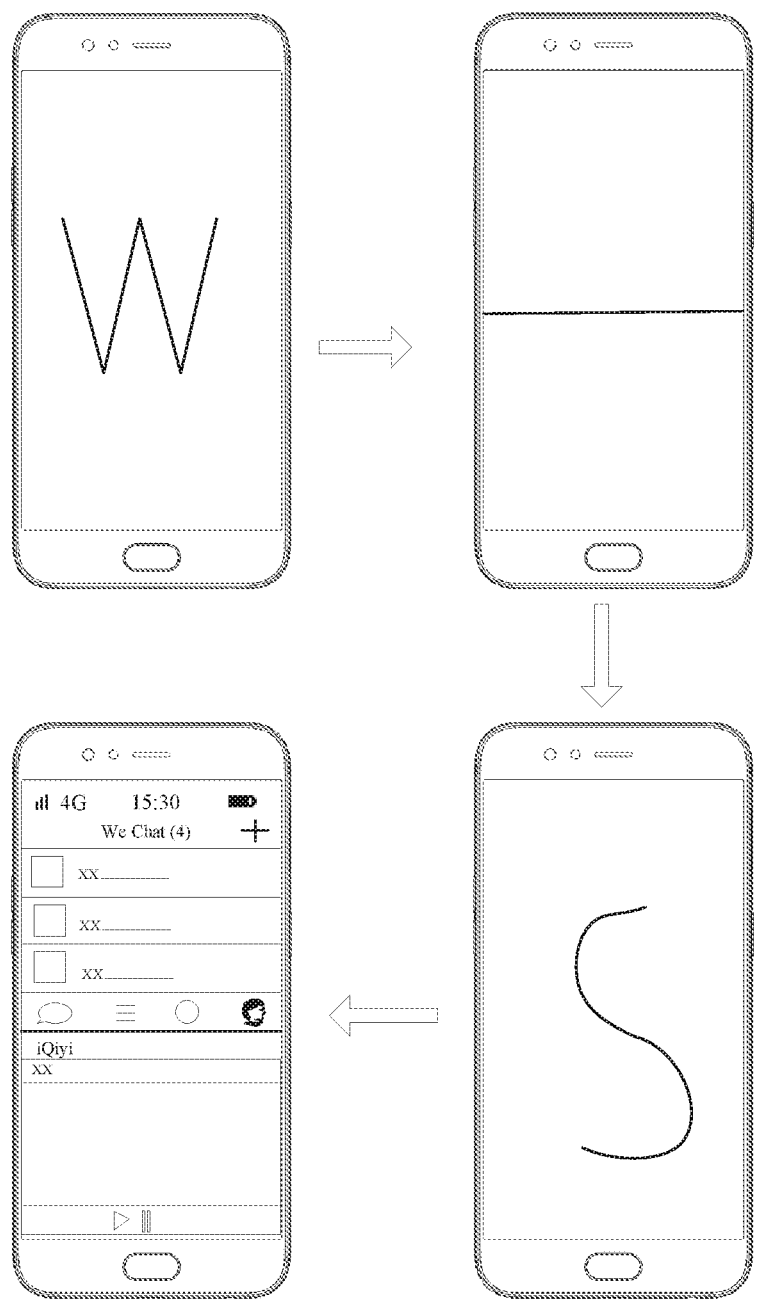
FIG. 5 is a schematic flowchart of a split-screen operation provided by an embodiment of the present disclosure.

Exemplarily, FIG. 5 is a schematic flowchart of a split-screen operation provided by an embodiment of the present disclosure. As shown in FIG. 5, it is assumed that the first screen-off gesture is W, and the corresponding first target application is WeChat.

At block 402, it is detected that whether a split-screen gesture is received within a first preset duration, and if yes, perform the action in block 403; otherwise, perform that in block 407. As shown in FIG. 5, the split-screen gesture is a horizontal line in the width direction of the mobile terminal, by which the screen is divided into two upper and lower areas.

The method further goes to block 403, the action including determining that the split-screen event is detected, and determining the split-screen mode according to the split-screen gesture. Exemplarily, according to the split-screen gesture shown in FIG. 5, it is determined that the split-screen mode is a split-screen mode of a top and bottom structure.

At block 404, it is detected that whether the second screen-off gesture is received within a second preset duration, and if yes, perform the action in block 405; otherwise, perform the action in block 408. At block 405, the second screen-off gesture is acquired, and the corresponding second target application according to the second screen-off gesture is determined.

As shown in FIG. 5, it is assumed that the second screen-off gesture is S, and the corresponding second target application is a video playback application, such as iQiyi.

The method proceeds to block 406, where it is to wake up the display and open the first target application and the second target application in the split-screen mode.

As shown in FIG. 5, after the display is waked up, the entire interface of the display is divided into two sub-screen areas. The upper sub-screen area displays the WeChat application interface, and the lower sub-screen area displays the iQiyi application interface. In this way, users can chat with their friends via WeChat while watching the video.

At block 407, the method includes waking up the display screen and opening the first target application in a full-screen mode. At block 408, it proceeds to waking up the display screen and opening the first target application and the split-screen application selection interface in the split-screen mode.

Figure 6:
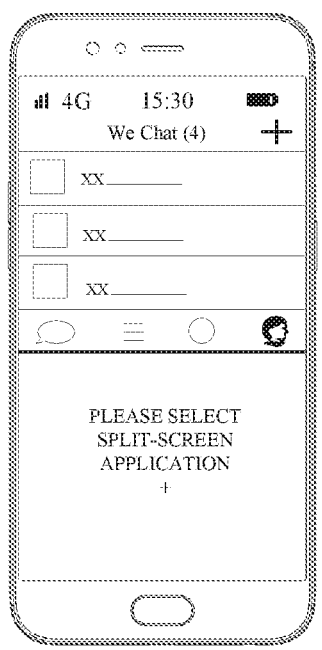
FIG. 6 is a schematic diagram of an interface provided by an embodiment of the present disclosure.

Exemplarily, FIG. 6 is a schematic diagram of an interface provided by an embodiment of the present disclosure. As shown in FIG. 6, after the display screen is waked up, the entire of the display screen is divided into two sub-screen areas. The upper sub-screen area displays the WeChat application interface, and the lower sub-screen area displays the split-screen application selection interface, where the user is prompted to "select a split-screen application". In this way, the user can select the application displayed in the lower split-screen area according to his or her needs.

According to the control method based on the screen-off gesture provided by the embodiment of the present disclosure, after acquiring a first screen-off gesture in a screen-off state, a split-screen gesture is received and a split-screen event is triggered. A split-screen mode is determined according to the split-screen gesture, and a second screen-off gesture is received, followed by opening different applications at the same time in the split-screen mode. This simplifies the processing flow of split-screen operations and improves the efficiency thereof.

Figure 7:
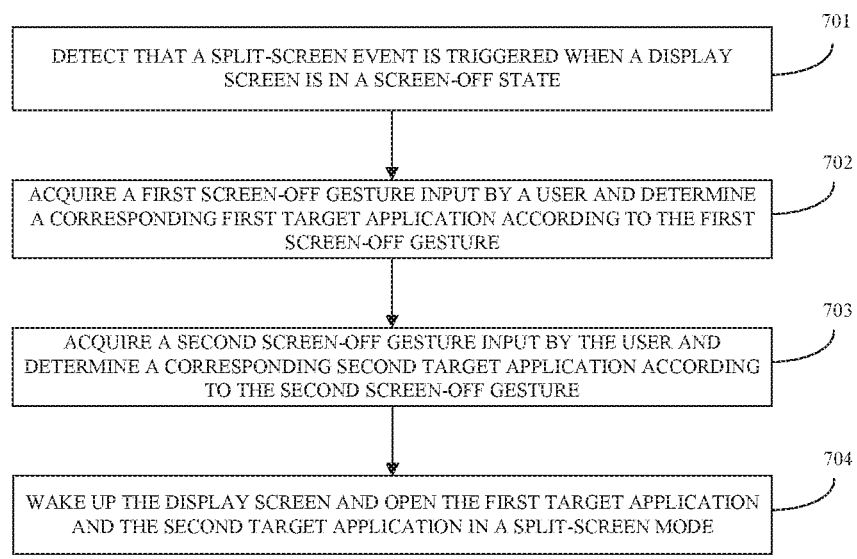
FIG. 7 is a schematic flowchart of another control method based on screen-off gestures provided by an embodiment of the present disclosure.

FIG. 7 is a schematic flowchart of another control method based on screen-off gestures provided by an embodiment of the present disclosure. The method may be performed by a control device based on screen-off gestures, wherein the device may be implemented by software and/or hardware and may generally be integrated in a mobile terminal.

As shown in FIG. 7, the method can include, at block 701, detecting that a split-screen event is triggered when the display screen is in a screen-off state.

Exemplarily, the user can enable the function of triggering the split-screen event on the screen-off in the mobile terminal according to his or her requirements. In the screen-off mode, the mobile terminal will detect the split-screen event at an appropriate time. Detecting that the split-screen event is triggered may include detecting that a second preset area of the display screen is touched, detecting a proximity event of the proximity sensor, detecting that a preset key (such as a volume adjustment key, etc.) is pressed, and detecting that a split-screen gesture is received, and the like, which is not limited in the embodiments of the present disclosure. This second preset area may be the same as that second preset area described above.

Exemplarily, the user can enable the function of triggering the split-screen event on the screen-off in the mobile terminal according to his or her requirements. In the screen-off mode, the mobile terminal will detect the split-screen event at an appropriate time. Detecting that the split-screen event is triggered may include detecting that the second preset area of the display screen is touched, and may further include detecting a proximity event of the proximity sensor, and may further include that a preset key (such as a volume adjustment key, etc.) is pressed. It also includes receiving a split-screen gesture and the like, which is not limited in the embodiment of the present disclosure. The second preset area may be the same as the second preset area described above.

In at least one alternative embodiment, different split-screen gestures may also correspond to different types of split-screen modes. For details, reference may be made to the description related to the split-screen mode in the above description, which will not be described here.

The method may further include, at block 702, acquiring a first screen-off gesture, and determining a corresponding first target application according to the first screen-off gesture; and at block 703, acquiring a second screen-off gesture, and determining a corresponding second target application according to the second screen-off gesture.

For the specific details of acquiring the first screen-off gesture and the second screen-off gesture and determining the corresponding first target application and the second target application in this embodiment of the present disclosure, reference may be made to the related description in the above, and details are not described herein again.

At block 704, the method proceeds to waking up the display and opening the first target application and the second target application in the split-screen mode.

In the control method based on the screen-off gesture provided by the embodiment of the present disclosure, after receiving the split-screen gesture, multiple screen-off gestures are respectively acquired, and multiple applications are opened in the split-screen mode after the display screen is waked up, thereby improving the efficiency of split-screen operation.

In an embodiment, after the first screen-off gesture is acquired, the method further includes detecting whether a second screen-off gesture is received within a third preset duration, and if yes, acquiring the second screen-off gesture. The optimization here is to reasonably determine the detection timing of the second screen-off gesture. The third preset duration may be set by the system by default, or may be set by the user according to individual needs. The embodiment of the present disclosure does not limit the specific value thereof, and may be, for example, 2 seconds, or may be other values.

In an embodiment, after detecting whether the second screen-off gesture is received within the third preset duration, the method further includes: if not, waking up the display screen and turning on the first target in full-screen mode; or, waking up the display screen and opening the first target application and the desktop in a split-screen mode; or, waking up the display screen and opening the first target application and the split-screen application selection interface in a split-screen mode. The above optimization provides the user with the opportunity to abandon entering the split-screen mode or abandon determining other split-screen applications other than the first target application in the screen-off mode.

In an embodiment, after detecting that the split-screen event is triggered, a certain time may also be set for detecting the first screen-off gesture. Specifically, after detecting that the split-screen event is triggered, whether the first screen-off gesture is received is detected within the fourth preset duration, and if it is received, the first screen-off gesture is acquired. Further, if it is not received, the split-screen event ends. The advantage of such a setting is that the mobile terminal can be prevented from receiving a screen-off gesture for a long time due to a false trigger of a split-screen event, thereby saving power consumption.

In an embodiment, waking up the display screen and opening the first target application and the second target application in the split-screen mode includes: acquiring first input position information of the first screen-off gesture and a second input position information of the second screen-off gesture; waking up the display screen, and opening the first target application and the second target application in a split-screen mode according to the first input position information and the second input position information. A display area of the first target application corresponds to the first input position information, and a display area of the second target application corresponds to the second input position information.

In an embodiment, when the first target application and the second target application are the same target application, it is determined that the target application is a multi-open application: the first target application is the main application, and the second target application is a clone application. Waking up the display screen and opening the first target application and the second target application in the split-screen mode includes: waking up the display screen and opening the main application and the clone application of the target application in the split-screen mode.

Figure 8:
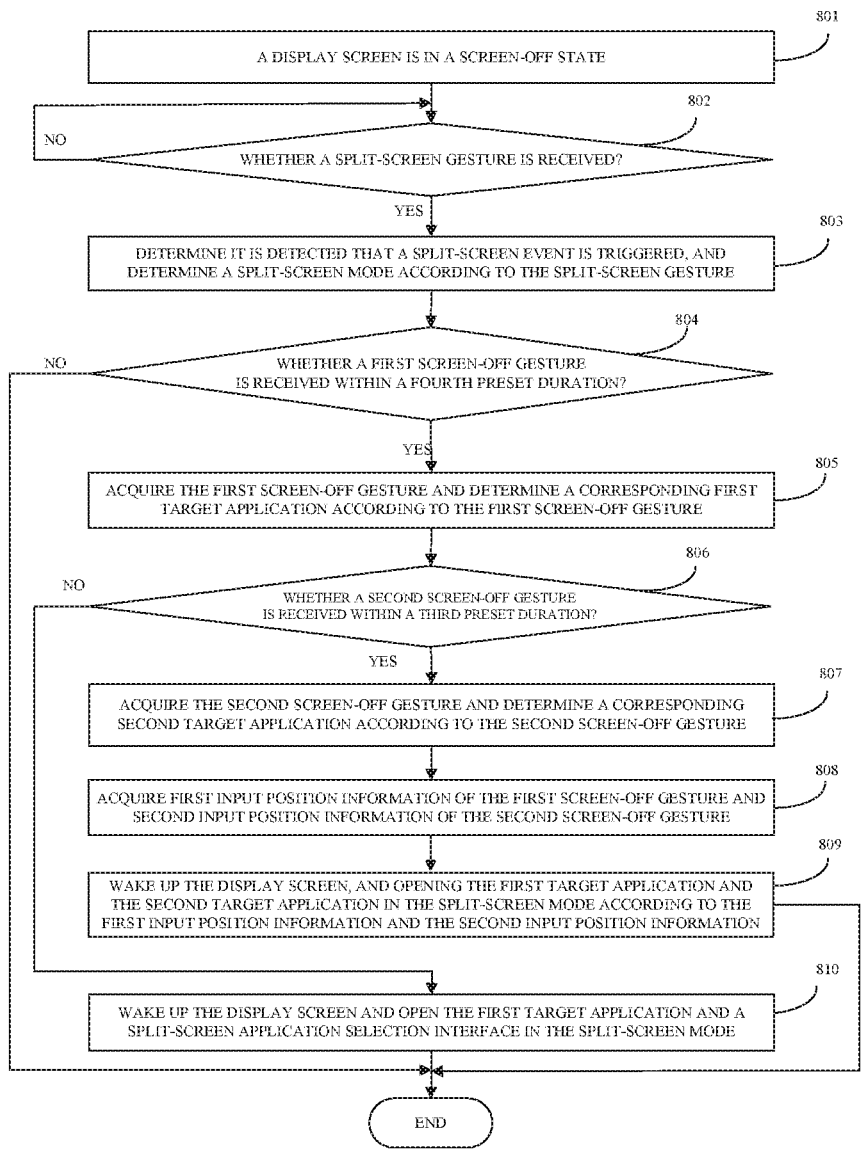
FIG. 8 is a schematic flowchart of another control method based on screen-off gestures provided by an embodiment of the present disclosure.

FIG. 8 is a schematic flowchart of another control method based on screen-off gestures provided by an embodiment of the present disclosure.

The control method of this embodiment includes actions at block 801 that display screen is in a screen-off state, and at block 802 that the method determines whether a split-screen gesture is received. If the split-screen gesture is received, the action in block 803 is performed; otherwise, the action in block 802 is repeatedly performed.

Figure 9:
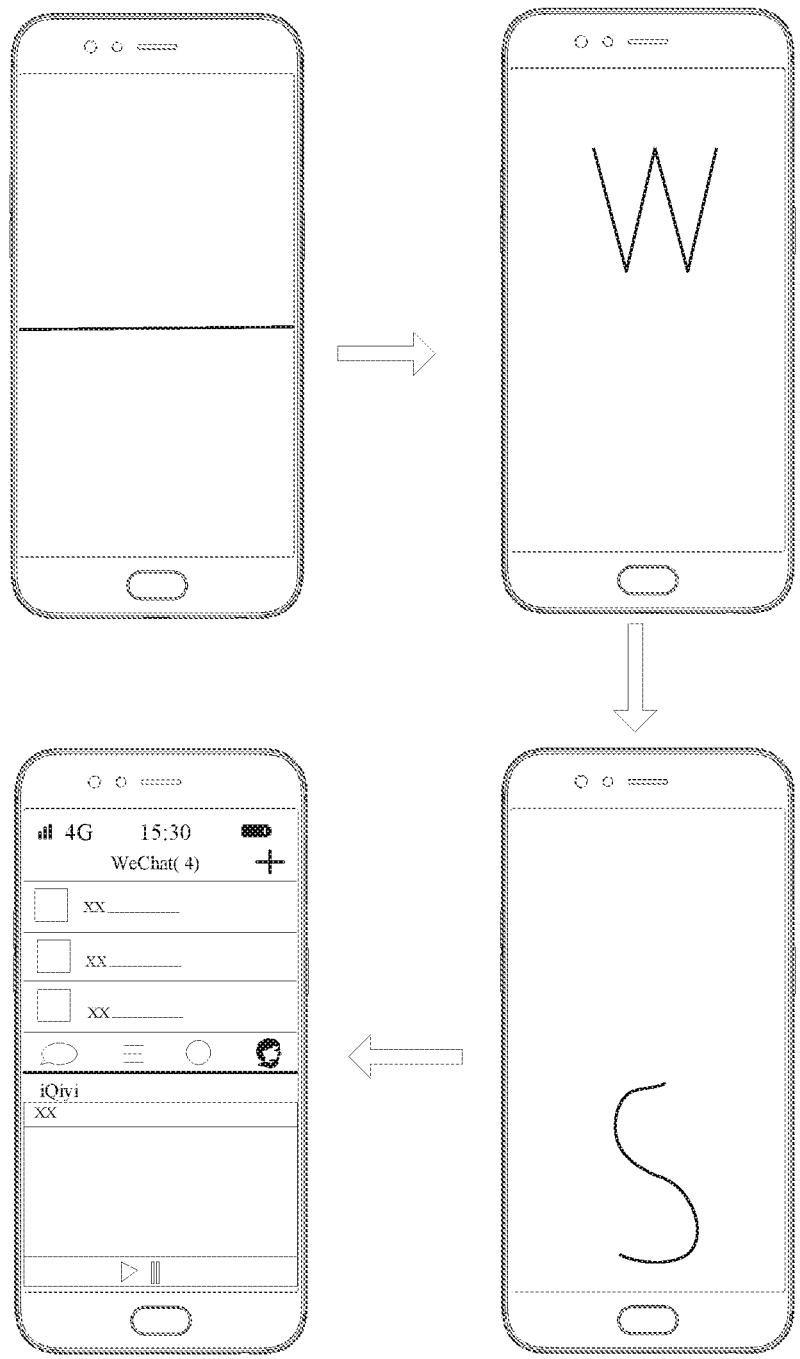
FIG. 9 is a schematic flowchart of another split-screen operation provided by an embodiment of the present disclosure.

Exemplarily, FIG. 9 is a schematic flowchart of another split-screen operation provided by an embodiment of the present disclosure. As illustrated in FIG. 9, the split-screen gesture is a horizontal line in the width direction of the mobile terminal, by which the screen is divided into two upper and lower areas.

At block 803, detection of the split-screen event is triggered is determined, and the split-screen mode is determined according to the split-screen gesture. Exemplarily, according to the split-screen gesture shown in FIG. 5, it is determined that the split-screen mode is of a top and bottom structure.

At block 804, whether the first screen-off gesture is received within the fourth preset duration is determined. If it is received, the action in block 805 is performed; otherwise, the flow ends. At block 805, the first screen-off gesture is acquired, and a corresponding first target application according to the first screen-off gesture is determined.

As shown in FIG. 9, it is assumed that the first screen-off gesture is W, and the corresponding first target application is WeChat.

At block 806, whether a second screen-off gesture is received within the third preset duration is detected. If it is received, perform the action in block 807; otherwise, perform the action in block 810. At block 807, the second screen-off gesture is acquired, and a corresponding second target application according to the second screen-off gesture is determined.

As shown in FIG. 9, it is assumed that the second screen-off gesture is S, and the corresponding second target application is a video playback application such as iQiyi.

The control method may include, at block 808, acquiring the first input position information of the first screen-off gesture and the second input position information of the second screen-off gesture. Specifically, the input location information may specifically be a split-screen area where a screen-off gesture is located. As shown in FIG. 9, the split-screen area of the first screen-off gesture is the upper half area, and the split-screen area of the second screen-off gesture is the lower half area.

The control method may also include, at block 809, waking up the display screen, and opening the first target application and the second target application in the split-screen mode according to the first input position information and the second input position information.

As shown in FIG. 9, after the display screen is waked up, the entire interface of the display screen is divided into two sub-screen areas. The upper sub-screen area displays the WeChat application interface, and the lower sub-screen area displays the iQiyi application interface. In this way, users can chat with their friends via WeChat while watching the video.

At block 810, the method goes to waking up the display screen and opening the first target application and the split-screen application selection interface in the split-screen mode.

In the control method based on the screen-off gesture provided by the embodiment of the present disclosure, the first screen-off gesture and the second screen-off gesture are acquired respectively after receiving the split-screen gesture in the screen-off state. Then, different applications are opened simultaneously in the split-screen mode according to the input position information of the screen-off gesture. The application program simplifies the processing flow of split-screen operation and improves the efficiency of split-screen operation.

Figure 10:
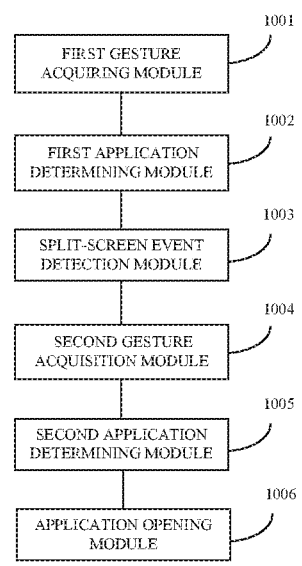
FIG. 10 is a structural block diagram of a control device based on screen-off gestures provided by an embodiment of the present disclosure.

FIG. 10 is a structural block diagram of a control device based on screen-off gestures provided by an embodiment of the present disclosure. The device can be implemented by software and/or hardware and is generally integrated in the terminal. The application can be opened by executing a control method based on screen-off gestures.

As shown in FIG. 10, the device includes the following modules. A first gesture acquiring module 1001 is configured to acquire a first screen-off gesture when the display screen is in a screen-off state. A first application determining module 1002 is configured to determine a corresponding first target application according to the first screen-off gesture. A split-screen event detection module 1003 is configured to detect whether the split-screen event is triggered. A second gesture acquisition module 1004 is configured to acquire a second screen-off gesture when the screen split event detection module detects that the split-screen event is triggered. A second application determining module 1005 is configured to determine a corresponding second target application according to the second screen-off gesture. An application opening module 1006 is configured to wake up the display screen and open the first target application and the second target application in a split-screen mode.

By the control device based on the screen-off gesture provided by the embodiment of the present disclosure, it is possible to determine an application program requiring a split-screen operation according to a screen-off gesture in a screen-off state of the mobile terminal, and the split-screen operation efficiency can be improved.

In at least one alternative embodiment, the split-screen event detection module is configured to detect whether the split-screen event is triggered within the first preset duration. The second gesture acquisition module is configured to acquire a second screen-off gesture if it is detected that the split-screen event is triggered.

In at least one alternative embodiment, the application opening module is further configured to, after detecting whether the split-screen event is triggered within the first preset duration, if it is not detected that the split-screen event is triggered, wake up the display screen and open the first target application in a full-screen mode.

In at least one alternative embodiment, the second gesture acquisition module is configured to: after detecting that the split-screen event is triggered, detect whether a second screen-off gesture is received within the second preset duration; if it is detected, the second screen-off gesture is acquired.

In at least one alternative embodiment, after detecting whether the second screen-off gesture is received within the second preset duration, the method further includes: if it is not received, wake up the display screen and opening the first target application in a full-screen mode; or, wake up the display screen and open the first target application and the desktop in the split-screen mode; or, wake up the display screen and display the first target application and the split-screen application selection interface in the split-screen mode.

In at least one alternative embodiment, waking up the display screen and opening the first target application and the second target application in the split-screen mode includes: acquiring first input position information of the first screen-off gesture and second input position information of the second screen-off gesture; waking up the display screen, and opening the first target application and the second target application in a split-screen mode according to the first input position information and the second input position information, wherein the display area the first target application corresponds to the first input location information, and the display area of the second target application corresponds to the second input location information.

In at least one alternative embodiment, when the first target application and the second target application are the same target application, it is determined that the target application is a multi-open application: the first target application is a main application, and the second target application is a clone application. In addition, waking up the display screen and opening the first target application and the second target application in split-screen mode includes: waking up the display screen, and opening the main application and the clone application of the target application in the split-screen mode.

Figure 11:
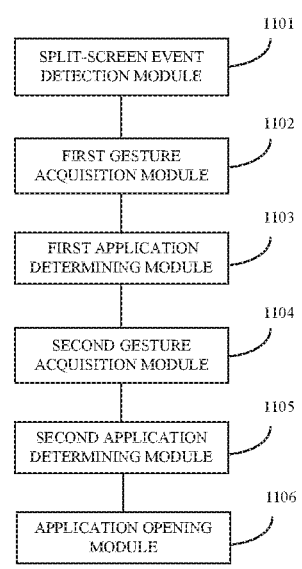
FIG. 11 is a structural block diagram of another control device based on screen-off gestures provided by an embodiment of the present disclosure.

FIG. 11 is a structural block diagram of another control device based on screen-off gestures provided by an embodiment of the present disclosure. The device can be implemented by software and/or hardware and is generally integrated in the terminal. The application can be started by executing a control method based on screen-off gestures.

As shown in FIG. 11, the device includes the following modules. A split-screen event detection module 1101 is configured to detect whether the split-screen event is triggered when the display screen is in a screen-off state. A first gesture acquisition module 1102 is configured to acquire a first screen-off gesture when the screen split event detection module detects that the split-screen event is triggered. A first application determining module 1103, configured to determine a corresponding first target application according to the first screen-off gesture. A second gesture acquisition module 1104 is configured to acquire a second screen-off gesture. A second application determining module 1105, configured to determine a corresponding second target application according to the second screen-off gesture. An application opening module 1106 is configured to wake up the display screen and open the first target application and the second target application in a split-screen mode.

By the control device based on the screen-off gesture provided by the embodiment of the present disclosure, it is possible to determine an application program requiring a split-screen operation according to a screen-off gesture in a screen-off state of the mobile terminal, and the split-screen operation efficiency can be improved.

In at least one alternative embodiment, the second gesture acquisition module is specifically configured to perform the action of, after acquiring the first screen-off gesture, detecting whether a second screen-off gesture is received within a third preset duration. If it is received, the second screen-off gesture can be acquired.

In at least one alternative embodiment, the application opening module is further configured to detect whether a second screen-off gesture is received within the third preset duration. If it is not detected, wake up the display screen and open the first target application in a full-screen mode; or, wake up the display screen and open the first target application and the desktop in a split-screen mode; or, wake up the display screen and open the first target application and the split-screen application selection interface in a split-screen mode.

An embodiment of the present disclosure further provides a storage medium. The storage medium contains computer executable instructions which, when executed by a computer processor, perform a control method based on screen-off gestures. The method includes acquiring a first screen-off gesture when a display screen is in a screen-off state, and determining a corresponding first target application according to the first screen-off gesture; detecting that a split-screen event is triggered, acquiring a second screen-off gesture, and determining a corresponding second target application according to the second screen-off gesture; and waking up the display screen and opening the first target application and the second target application in a split-screen mode.

Alternatively, the method includes: detecting that a split-screen event is triggered when a display screen is in a screen-off state; acquiring a first screen-off gesture, and determining a corresponding first target application according to the first screen-off gesture; acquiring a second screen-off gesture, and determining a corresponding second target application according to the second screen-off gesture; and waking up the display screen, and opening the first target application and the second target application in a split-screen mode.

The storage media can be any of various types of memory devices or storage devices. The term "storage medium" is intended to include: a mounting medium such as a CD-ROM, a floppy disk, or a magnetic tape device; a computer system memory or a random access memory such as DRAM, DDR RAM, SRAM, EDO RAM, Rambus RAM, etc.; non-volatile memory, such as flash memory, magnetic media (e.g., hard disk or optical storage); registers or other similar types of memory elements, etc. The storage medium may also include other types of memory or a combination thereof. In addition, the storage medium may be located in a first computer system in which the program is executed, or may be located in a different second computer system, and the second computer system is connected to the first computer system through a network such as the Internet. The second computer system may provide program instructions to the first computer for execution. The term "storage media" may include two or more storage media that may reside in different locations, such as in different computer systems connected through a network. A storage medium may store program instructions (e.g., embodied as a computer program) that are executable by one or more processors.

Of course, a storage medium containing computer-executable instructions is provided by the embodiments of the present disclosure. The computer-executable instructions are not limited to the control operations based on the screen-off gesture as described above, and may also perform the related operations in the control method based on the screen-off gesture of any embodiment provided by the present disclosure.

Figure 12:
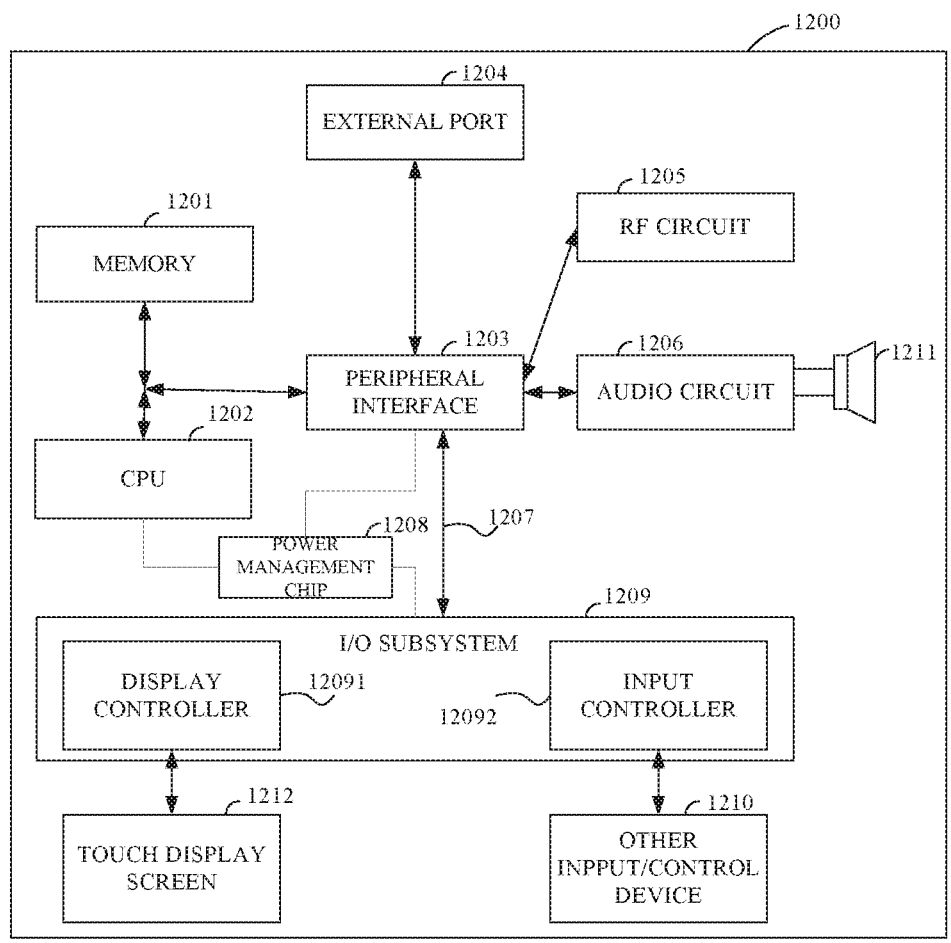
FIG. 12 is a schematic structural diagram of a mobile terminal according to an embodiment of the present disclosure.

An embodiment of the present disclosure provides a mobile terminal, and control device for the screen display provided by the embodiment of the present disclosure may be integrated in the mobile terminal. FIG. 12 is a schematic structural diagram of a mobile terminal according to an embodiment of the present disclosure. As shown in FIG. 12, the mobile terminal may include a casing (not shown), a memory 1201, a Central Processing Unit (CPU) 1202 (also referred to as a processor, hereinafter simply referred to as a CPU), and a circuit board (not shown) and a power circuit (not shown). The circuit board is disposed inside the space enclosed by the housing; the CPU 1202 and the memory 1201 are disposed on the circuit board. The power circuit is used for supplying power to various circuits or devices of the mobile terminal. The memory 1201 is configured to store executable program code. The CPU 1202 executes a computer program corresponding to the executable program code by reading the executable program code stored in the memory 1201 to implement a method. The method includes acquiring a first screen-off gesture when a display screen is in a screen-off state, and determining a corresponding first target application according to the first screen-off gesture; detecting that a split-screen event is triggered, acquiring a second screen-off gesture, and determining a corresponding second target application according to the second screen-off gesture; and waking up the display screen and opening the first target application and the second target application in a split-screen mode.

Alternatively, the method includes detecting that a split-screen event is triggered when a display screen is in a screen-off state; acquiring a first screen-off gesture, and determining a corresponding first target application according to the first screen-off gesture; acquiring a second screen-off gesture, and determining a corresponding second target application according to the second screen-off gesture; and waking up the display screen, and opening the first target application and the second target application in a split-screen mode.

The mobile terminal further includes a peripheral interface 1203, an RF (Radio Frequency) circuit 1205, an audio circuit 1206, a speaker 1211, a power management chip 1208, and input/output (I/O) subsystem and other input/output devices, a touch screen 1212, other input/control devices 1210, and an external port 1204. These components communicate through one or more communication buses or signal lines 1207.

It should be understood that the illustrated mobile terminal 1000 is only an example of a mobile terminal, and the mobile terminal 1000 may have more or fewer components than shown in the figures. Two or more components may be combined, or different component configurations may be adopted. The various components shown in the figures may be implemented in hardware, software, or a combination of hardware and software including one or more signal processing and/or application specific integrated circuits.

The following describes in detail the mobile terminal for controlling the application based on the screen-off gesture provided in this embodiment. The mobile terminal uses the mobile phone as an example.

The memory 1201 may be accessed by the CPU 1202, the peripheral interface 1203, etc., the memory 1201 may include a high speed random access memory, and may also include a non-volatile memory, such as one or more magnetic disk storage devices, and a flash memory device, or other volatile solid state memory devices.

The Peripheral interface 1203 can connect input and output peripherals of the device to CPU 1202 and memory 1201.

The I/O subsystem 1209 may connect the input and output peripherals on the device, such as touch screen 1212 and other input/control devices 1210, to the peripherals interface 1203. The I/O subsystem 1209 may include a display controller 12091 and one or more input controllers 12092 for controlling other input/control devices 1210. One or more input controllers 12092 receive electrical signals from other input/control devices 1210 or send electrical signals to other input/control devices 1210, and other input/control devices 1210 may include physical buttons (press buttons, rocker buttons, etc.), dial, slide switch, joystick, click wheel. It is worth noting that the input controller 12092 can be connected to any one of the following: a keyboard, an infrared port, a USB interface, and a pointing device such as a mouse.

The touch screen 1212 is an input interface and an output interface between the user's mobile terminal and the user, and displays the visual output to the user. The visual output may include graphics, text, icons, videos, and the like.

The Display controller 12091 in the I/O subsystem 1209 receives an electrical signal from the touch screen 1212 or sends an electrical signal to the touch screen 1212. The touch screen 1212 detects the contact on the touch screen, and the display controller 12091 converts the detected contact into the interaction with the user interface object displayed on the touch screen 1212. That is, the human-machine interaction is realized. The user interface object displayed on the touch screen 1212 may be icons for running games, icons for networking to corresponding networks, etc. It should be noted that the device may also include a light mouse, which is a touch-sensitive surface that does not display visual output, or an extension of a touch-sensitive surface formed by the touch screen.

The RF circuit 1205 is mainly used to establish the communication between the mobile phone and the wireless network (i.e., the network side), and realize the data reception and transmission of the mobile phone and the wireless network such as sending and receiving text messages, emails, etc. Specifically, the RF circuit 1205 receives and transmits an RF signal, which is also referred to as an electromagnetic signal. The RE circuit 1205 converts the electrical signal into an electromagnetic signal or converts the electromagnetic signal into an electrical signal and communicates with the communication network and other devices through the electromagnetic signal. The RF circuitry 1205 may include known circuitry for performing these functions, including but not limited to antenna systems, RF transceivers, one or more amplifiers, tuners, one or more oscillators, digital signal processors, CODECs (COder-DECoder, codec) chipset, subscriber identity module (SIM), and so on.

The audio circuit 1206 is mainly configured to receive audio data from the peripheral interface 1203, convert the audio data into an electrical signal, and send the electrical signal to the speaker 1211.

The speaker 1211 is configured to restore the voice signal received from the wireless network by the mobile phone through the RF circuit 1205 to voice and play the voice to the user.

The power management chip 1208 is configured to provide power supply and power management to the hardware connected to the CPU 1202, the I/O subsystem, and the peripheral interface.

By the mobile terminal provided by the embodiment of the present disclosure, it is possible to determine an application program requiring a split-screen operation according to a screen-off gesture in a screen-off state of the mobile terminal, and improve the split-screen operation efficiency.

The control device, the storage medium, and the mobile terminal based on the screen-off gesture provided in the foregoing embodiments may perform the control method based on the screen-off gesture provided by any embodiment of the present disclosure, and have the corresponding functional modules and beneficial effects of performing the method. For the technical details not described in detail in the above embodiments, reference may be made to the control method based on screen-off gestures provided by any embodiment of the present disclosure.

Note that the above is merely preferred embodiments of the present disclosure and applied technical principles. Those skilled in the art will understand that the present disclosure is not limited to the specific embodiments described herein, and various obvious changes, readjustments, and substitutions can be made by those skilled in the art without departing from the scope of the present disclosure. Therefore, although the present disclosure has been described in detail through the above embodiments, the present disclosure is not limited to the above embodiments, and other equivalent embodiments may also be included without departing from the concept of the present disclosure. The scope of the disclosure is determined by the scope of the appended claims.

What is claimed is that:

1. A split-screen control method based on screen-off gestures, comprising:
    acquiring a first screen-off gesture when a display screen is in a screen-off state, and determining a corresponding first target application according to the first screen-off gesture;
    after detecting that a split-screen event is triggered, acquiring a second screen-off gesture when the display screen is in the screen-off state, and determining a corresponding second target application according to the second screen-off gesture; and
    waking up the display screen and opening the first target application and the second target application in a split-screen mode,
    wherein after detecting that a split-screen event is triggered, acquiring a second screen-off gesture when the display screen is in the screen-off state comprises:
    detecting that the split-screen event is triggered within a first preset duration, and detecting whether a second screen-off gesture when the display screen is in the screen-off state is received within a second preset duration;
    acquiring the second screen-off gesture when the display screen is in the screen-off state if it is detected that the second screen-off gesture when the display screen is in the screen-off state is received; and
    waking up the display screen and opening the first target application, if it is detected that no second screen-off gesture when the display screen is in the screen-off state is received within the second preset duration.

2. The method of claim 1, wherein waking up the display screen and opening the first target application further comprises:
    waking up the display screen and opening the first target application in a full-screen mode.

3. The method of claim 1, wherein waking up the display screen and opening the first target application further comprises:
waking up the display screen and opening the first target application and a desktop in a split-screen mode.

4. The method of claim 1, wherein waking up the display screen and opening the first target application further comprises:
waking up the display screen and opening the first target application and a split-screen application selection interface in the split-screen mode.

5. The method of claim 1, wherein waking up the display screen and opening the first target application and a split-screen application selection interface in a split-screen mode comprises:
acquiring first input position information of the first screen-off gesture when the display screen is in the screen-off state and second input position information of the second screen-off gesture when the display screen is in the screen-off state; and
waking up the display screen, and opening the first target application and the second target application in the split-screen mode according to the first input position information and the second input position information, wherein a display area of the first target application corresponds to the first input position information, and a display area of the second target application corresponds to the second input position information.

6. The method of claim 1, wherein when the first target application and the second target application are a same target application, determining that the target application is a multi-open application, the first target application is a main application and the second target application is a clone application;
waking up the display screen and opening the first target application and the second target application in the split-screen mode includes:
waking up the display screen, and opening the main application and the clone application of the target application in the split-screen mode.

7. The method of claim 1, wherein before waking up the display screen and opening the first target application and the second target application in a split-screen mode, the method further comprises:
receiving unlocking information and performing verification to the unlocking information.

8. The method of claim 1, wherein detecting that the split-screen event is triggered comprises:
detecting that a split-screen gesture is received; or
detecting that a preset key is pressed,
wherein the split-screen gesture is a screen-off gesture, and does not correspond to an application, but corresponds to an instruction that triggers a split-screen event, and different split-screen gestures correspond to different types of split-screen modes.

9. The method of claim 1, wherein the split-screen mode is dynamically determined based on a type of the split-screen event, and different gestures types correspond to different applications.

10. A mobile terminal comprising a memory, a processor, and a computer program stored on the memory and operable on the processor, wherein the processor executes the computer program to implement a control method based on screen-off gestures, the method including:
acquiring a first screen-off gesture when a display screen is in a screen-off state, and determining a corresponding first target application according to the first screen-off gesture;
after detecting that a split-screen event is triggered, acquiring a second screen-off gesture when the display screen is in the screen-off state, and determining a corresponding second target application according to the second screen-off gesture; and
waking up the display screen and opening the first target application and the second target application in a split-screen mode,
wherein after detecting that a split-screen event is triggered, acquiring a second screen-off gesture when the display screen is in the screen-off state comprises:
detecting that the split-screen event is triggered within a first preset duration, and detecting whether a second screen-off gesture when the display screen is in the screen-off state is received within a second preset duration;
acquiring the second screen-off gesture when the display screen is in the screen-off state if it is detected that the second screen-off gesture when the display screen is in the screen-off state is received; and
waking up the display screen and opening the first target application, if it is detected that no second screen-off gesture when the display screen is in the screen-off state is received within the second preset duration.

11. The mobile terminal of claim 10, wherein waking up the display screen and opening the first target application further comprises:
waking up the display screen, and
opening the first target application in a full-screen mode, or opening the first target application and a desktop in a split-screen mode.

12. The mobile terminal of 10, wherein waking up the display screen and opening the first target application further comprises:
waking up the display screen and opening the first target application and a split-screen application selection interface in the split-screen mode.

13. The mobile terminal of claim 10, wherein waking up the display screen and opening the first target application and a split-screen application selection interface in a split-screen mode comprises:
acquiring first input position information of the first screen-off gesture when the display screen is in the screen-off state and second input position information of the second screen-off gesture when the display screen is in the screen-off state; and
waking up the display screen, and opening the first target application and the second target application in the split-screen mode according to the first input position information and the second input position information, wherein a display area of the first target application corresponds to the first input position information, and a display area of the second target application corresponds to the second input position information.

14. The mobile terminal of claim 10, wherein when the first target application and the second target application are a same target application, determining that the target application is a multi-open application, the first target application is a main application and the second target application is a clone application;
waking up the display screen and opening the first target application and the second target application in the split-screen mode includes:

waking up the display screen, and opening the main application and the clone application of the target application in the split-screen mode.

15. The mobile terminal of claim 10, wherein before waking up the display screen and opening the first target application and the second target application in a split-screen mode, the method further comprises:

receiving unlocking information and performing verification to the unlocking information.

16. A non-transitory computer-readable storage medium having stored thereon a computer program, characterized in that the program is executed by a processor to implement a control method based on screen-off gestures, the method comprising:

acquiring a first screen-off gesture when a display screen is in a screen-off state, and determining a corresponding first target application according to the first screen-off gesture;

after detecting that a split-screen event is triggered, acquiring a second screen-off gesture when the display screen is in the screen-off state, and determining a corresponding second target application according to the second screen-off gesture; and waking up the display screen and opening the first target application and the second target application in a split-screen mode, wherein after detecting that a split-screen event is triggered, acquiring a second screen-off gesture when the display screen is in the screen-off state comprises:

detecting that the split-screen event is triggered within a first preset duration, and detecting whether a second screen-off gesture when the display screen is in the screen-off state is received within a second preset duration;

acquiring the second screen-off gesture when the display screen is in the screen-off state if it is detected that the second screen-off gesture when the display screen is in the screen-off state is received; and waking up the display screen and opening the first target application, if it is detected that no second screen-off gesture when the display screen is in the screen-off state is received within the second preset duration.

* * * * *